United States Patent [19]
Hall

[11] Patent Number: 5,821,009
[45] Date of Patent: Oct. 13, 1998

[54] FAULT TOLERANT BIPOLAR GAS ELECTRODE DESIGN FOR A RECHARGEABLE BATTERY

[75] Inventor: John C. Hall, Saratoga, Calif.

[73] Assignee: Space Systems/Loral, Inc., Palo Alto, Calif.

[21] Appl. No.: 810,187

[22] Filed: Mar. 3, 1997

[51] Int. Cl.[6] .................................................... H01M 6/48
[52] U.S. Cl. .......................................... 429/155; 429/210
[58] Field of Search ................................... 429/152, 153, 429/154, 155, 210

[56] References Cited

U.S. PATENT DOCUMENTS

| | | | |
|---|---|---|---|
| 4,203,202 | 5/1980 | Esaian et al. | 429/155 X |
| 4,327,158 | 4/1982 | Holleck | 429/155 X |
| 5,354,630 | 10/1994 | Earl et al. | 429/154 X |
| 5,395,706 | 3/1995 | Hall | 429/50 |
| 5,395,708 | 3/1995 | Hall | 429/120 |
| 5,578,394 | 11/1996 | Oweis et al. | 429/210 X |
| 5,652,073 | 7/1997 | Lenhart et al. | 429/210 |

*Primary Examiner*—Stephen Kalafut
*Attorney, Agent, or Firm*—Perman & Green, LLP

[57] ABSTRACT

A bipolar rechargeable battery comprises a vessel with an insulated liner and an interior region for bulk storage of a gas which serves as an electrode active material. A plurality of cells are nested within the vessel, each including a metallic bipolar cup having a circular base and an integral insulated hydrophobic upstanding side wall of truncated conical shape diverging with increased distance from the base. A solid phase positive electrode overlies the base. A dielectric separator separates the positive electrode and a gas phase negative electrode is configured to permit passage of electrolyte between the bipolar base of its cell and the base of an adjoining cell. The upstanding side wall of each cell is oriented to enable gas passage from each of said cells to the bulk gas storage region. The upstanding side walls of the adjacent cells mutually define a gap enabling gas communication between the adjacent cells and between each of the cells and the bulk gas storage region. In one embodiment, there is no gas screen between the negative electrode and the bipolar base of an adjoining cell. In another embodiment, a gas screen is provided having a fine porosity but of larger porosity than that of the separator.

23 Claims, 5 Drawing Sheets

FAULT TOLERANT BIPOLAR GAS ELECTRODE DESIGN FOR A RECHARGEABLE BATTERY

BACKGROUND OF THE INVENTION

1. Field of the Invention

The present invention relates to the design of a bipolar cell for gas depolarized rechargeable batteries such as nickel hydrogen and zinc oxygen. More particularly, the invention prevents failure of gas depolarized rechargeable bipolar batteries as a result of irreversible electrolyte loss from the condensed electrode-separator to the gas side of the opposing electrode. The invention provides for returning escaped electrolyte to the condensed electrode-separator region of the cell. It further reduces cell weight by eliminating the gas screen in one of its preferred embodiments. The invention leads to a much more reliable battery design as it is highly tolerant of minor imperfections in the gas electrode. This reduces battery mass and cost as compared with designs which focus on increased gas electrode wet proofing.

2. Discussion of the Prior Art

Such failure of gas depolarized rechargeable bipolar batteries as a result of irreversible electrolyte loss from the condensed electrode-separator to the gas side of the opposing electrode is normally addressed by overdesign of the gas electrode to prevent electrolyte penetration and thus its isolation on the gas side. This embodiment, however, is heavy and can never be 100% reliable.

Gas diffusion electrodes for rechargeable batteries have the features illustrated in FIG. 1 which depicts a nickel hydrogen battery 20 as taught in commonly assigned U.S. Pat. No. 5,652,073 issued Jul. 29, 1997, entitled, "Bipolar Design for a Gas Depolarized Battery". A plurality of cells 36 are suitably mounted within a pressure vessel, specifically within a central cylinder 22 in a nested relationship. Each cell 36 contains a metered predetermined quantity of electrolyte and includes a metallic bipolar cup 38 having a base 40 and an integral upstanding side wall 42 encompassing the base. Preferably the upstanding side wall is of truncated conical shape diverging with increased distance from the base, although other shapes may be utilized including the side wall 42 being substantially coplanar with the base 40. An insulating material 44 covers the upstanding side wall 42.

The metallic bipolar cup 38 may be fabricated from a variety of materials including nickel, aluminum plated with nickel, stainless steel, metallic coated graphite composite and titanium. A preferred side wall coating is a hydrophobic fluorocarbon such as Teflon®.

A condensed phase electrode 46 is positioned proximate the base. The condensed phase electrodes typically used for the purposes of the present invention are typically 84% porous 0.1 cm thick sintered nickel supported on a nickel screen and electrochemically loaded to between 1.0 and 2.5 $g/cm^3$ of void volume with active $Ni(OH)_2$. This is a standard aerospace positive electrode although it is understood that a variety of nickel positive electrodes could be employed. In particular a sintered nickel electrode without a support screen would be preferred as the screen is not needed for current conduction in a bipolar battery.

Overlying the condensed phase electrode 46 is a gas electrode 48 including a condensed current collector for a gaseous active material. The gas electrode is typically platinum powder or platinized carbon powder bonded with Teflon® and supported on carbon cloth or expanded metal.

The gas electrode must be conductive through its thickness and, to this end, has no hydrophobic wet proofing porous Teflon® layer. Back side hydrophobicity is still required in order that the electrolyte not flood and block a gas screen 54, to be described. This is achieved by the vendor of the gas electrode 48 using a proprietary hydrophobic carbon coating on the gas side of the electrode. It will be appreciated that the gas electrode 48 is a solid current collector for a gaseous active material and is sized to fittingly engage the side wall 42 such that any gas generated at the condensed phase electrode 46 must pass through the gas electrode to escape the cell 36 to thereby recombine the generated gas with the active material gas within the cell.

Intermediate the gas electrode 48 and the condensed phase electrode 46 is a dielectric separator 50. One form of the separator employed for purposes of the invention is $ZrO_2$ woven cloth approximately 80% porous and 0.05 cm thick. However, other suitable materials could be used to achieve a similar result. The separator acts to electrically insulate the opposing electrodes but allows ionic conduction between the electrodes via the liquid electrolyte which fills the pores of the separator.

The upstanding side walls 42 of adjacent cells 36 are oriented such that they mutually define a gap 52 enabling gas communication between the adjacent cells and between each of the cells and the interior bulk gas region 34 within the battery 20. As previously noted, an insulating liner 24 is provided on the inner surface of the vessel for assuring its fluid integrity.

Rounding out the construction of the cell 36 is a gas screen 54 of porous conductive inert material for providing a gas conduit from the bulk gas storage volume to the gas electrode 48. The gas screen 54 may be any porous conductive inert material such as nickel screen, porous nickel felt, nickel coated plastic screen, and the like. Throughout the remainder of the disclosure, this particular material will be referred to as "felted nickel fibers". It serves the purpose of allowing shared $H_2$ access to the entire face of the gas electrode and provides electrical conductivity between adjacent cells.

Each cell 36 is assembled by laying the components up in the metallic bipolar cup in the order illustrated in FIG. 1. Once the condensed phase electrode 46 and dielectric separator 50 are in place, sufficient electrolyte is introduced to the cup to fill between 60% and 100% of the porous volume of the condensed phase electrode and separator. The electrolyte for this battery is typically a mixture of KOH and LiOH in water with weight percent between 15% and 45% of KOH and 0% and 20% of LiOH. After electrolyte introduction, assembly is completed by laying the gas electrode 48 and gas screen 54 in the metallic cup. Battery assembly consists of repetitively stacking cells to achieve the desired cell count and battery voltage. The stacked cells are placed in the pressure vessel defined by the central cylinder 22 and end caps (not shown), compressed to the design stack height, and bus leads 56 (negative) and 58 (positive) from the electrodes 60, 40, respectively, are attached to the battery terminals, and the vessel closed.

Key features of this design are:

The gas duct behind the gas electrode which allows active material to be transported between the electrochemical cell and the bulk gas storage; and The diffusion gas electrode which provides functions for (a) the catalytic oxidation and reduction of the gaseous active material, (b) a partially hydrophobic internal structure which allows intimate high surface area contact between the gas phase, electrolyte solution, and the solid electronically conductive phase, and (c) a completely hydrophobic electrically conductive porous barrier at the interface to the gas duct which prevents leakage of electrolyte solution but allows access of gas.

Experimentation has found feature (c) to be a critical element of the above embodiment. In testing bipolar batteries of this embodiment, it has been found that if the gas electrode has a through pin hole leak to the gas duct electrolyte will seep through the hole and accumulates droplets in the gas screen. Based on post test examination and the discharge voltage characteristic which develops as the battery cycles (see FIG. 2), it appears that the loss of electrolyte leads to (i) separator dry out and (ii) the development of a high resistance as discharge proceeds which in turn leads to a substantial voltage loss. Post test examination of the battery from which the curves in FIG. 2 were derived indicate that in two of the four operating cells, electrolyte loss from the separator to the gas screen had occurred to an extent of 38% and 22%, respectively.

It is speculated that the voltage oscillation evidenced in FIG. 2 as discharge proceeds is a result of density changes in the positive active material (solid $NiOH_x$). Regardless of details of the mechanism, leakage of electrolyte through the gas electrode represents a design failure and the observed consequence of this is an unacceptable discharge voltage loss.

The frequency of the failure can be reduced by improving the gas side hydrophobicity through, for example, application of additional porous hydrophobic material to the gas side of the electrode. This embodiment, however, adds mass to the battery and only reduces the probability of the failure. As the failure may ultimately lead to an open circuit condition in the battery, it represents the most serious performance failure category (that is, complete loss of function versus erosion of function).

SUMMARY OF THE INVENTION

It was in light of the foregoing that the present invention was conceived and is now hereby reduced to practice. Thus, a bipolar rechargeable battery comprises a vessel with an insulated liner and an interior region for bulk storage of a gas which serves as an electrode active material. A plurality of cells are nested within the vessel, each including a metallic bipolar cup having a circular base and an integral insulated hydrophobic upstanding side wall of truncated conical shape diverging with increased distance from the base. A solid phase positive electrode overlies the base. A dielectric separator separates the positive electrode and a gas phase negative electrode is configured to permit passage of electrolyte between the bipolar base of its cell and the base of an adjoining cell. The upstanding side wall of each cell is oriented to enable gas passage from each of said cells to the bulk gas storage region. The upstanding side walls of the adjacent cells mutually define a gap enabling gas communication between the adjacent cells and between each of the cells and the bulk gas storage region. In one embodiment, there is no gas screen between the negative electrode and the bipolar base of an adjoining cell. In another embodiment, a gas screen is provided having a fine porosity but of larger porosity than that of the separator.

As described in the preceding section, in conventional bipolar cell designs, gas electrode electrolyte leakage leads to failure since there is no means for electrolyte in the gas duct to return to the solid electrode-separator region of the bipolar cell. It came to be realized that this was a result of (a) the gas screen not providing a wicking action for returning isolated electrolyte to the solid electrode and (b) no access path between the gas screen-duct region and the solid electrode-separator region. This latter point is illustrated in FIG. 1 where a conventional bipolar battery design is illustrated. Note that in FIG. 1 the gas electrode in effect seals the gas duct region from the solid electrode-separator region. Thus even if electrolyte could be wicked by the gas screen, there would be no access for its return to the solid phase electrode-separator region.

Based on this analysis, two embodiments have been developed and demonstrated for returning lost electrolyte to the solid electrode-separator cell region and thereby creating a more robust-fault tolerant design. In one instance, the gas screen of the known battery has been eliminated as a cell component. In the other instance, the coarse gas screen has been replaced with a finely pored hydrophilic gas screen such as nickel fiber metal while also the size of the gas electrode has been reduced thereby exposing the upper bipolar plate to the lower separator.

Accordingly, it is a primary object of the invention to provide an improved bipolar cell for gas depolarized rechargeable batteries such as nickel hydrogen and zinc oxygen.

Another object of the invention is to provide an improved bipolar cell for gas depolarized rechargeable battery so constructed as to prevent failure as a result of irreversible electrolyte loss from the condensed electrode-separator to the gas side of the opposing electrode.

Still another object of the invention is to provide such a gas depolarized battery which provides for returning escaped electrolyte to the condensed electrode-separator region of the cell.

Yet another object of the invention is to provide such a gas depolarized battery which reduces cell weight by eliminating the gas screen in one of its preferred embodiments.

Yet a further object of the invention is to provide such a gas depolarized battery bipolar electrode structure based on a conductive cup with insulated hydrophobic conical side walls which act to (a) insulate the cell from adjacent cells and (b) impede the exchange of electrolyte solution between cells.

A further object of the invention is to provide such a bipolar battery with conical or cup-shaped electrodes assembled in a nested fashion.

Yet another object of the invention is to provide such a bipolar battery in which the gas electrode is configured to permit passage of electrolyte between the bipolar base of its cell and the base of an adjoining cell.

Still a further object of the invention is to apply the foregoing concepts to rechargeable gas depolarized batteries which include nickel hydrogen, silver hydrogen, zinc oxygen, cadmium oxygen and iron oxygen.

Yet a further object of the invention is to provide such a battery construction with a bipolar cup structure wherein the metallic cup is preferably nickel although titanium may be used, and the insulator is, for example, a hydrophobic insulator such as Teflon®.

Still another object of the invention is to provide a method of constructing a bipolar gas depolarized rechargeable cell in which the gas screen is replaced with the fine pored hydrophobic gas side of the negative electrode, such a design requiring that the gas composition be pure active material to prevent diffusion starvation of active material.

Still another object of the invention is to provide compensation of electrolyte leakage in the aforesaid design of a bipolar gas depolarized rechargeable cell by (a) selecting a hydrophilic bipolar plate material which is filmed with escaped electrolyte and (b) providing a return passage for escaped electrolyte by locally directly contacting the bipolar plate with the separator.

Yet another object of the invention is to provide such a bipolar battery construction which prevents $O_2$ escape at the contact site in the preceding object by placing a recombination catalyst on the gas screen or on the bipolar plate at the access location.

Yet a further object of the invention is to provide such a gas depolarized rechargeable bipolar cell design in which the gas screen is selected to have a slightly (at last 20%) greater pore size than the separator, is hydrophilic and locally is in direct contact with the separator. In this instance, the gas screen so described can act as a return conduit for electrolyte which leaks out of the separator to the back side of the negative electrode.

Still a further object of the invention is to provide such a gas depolarized rechargeable bipolar cell design which prevents $O_2$ escape at the contact site by placing a recombination catalyst the bipolar plate at the access location.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and, together with the description, serve to explain the principles of the invention in general terms. Like numerals refer to like parts throughout the disclosure.

DETAILED DESCRIPTION OF THE PREFERRED EMBODIMENT

It was earlier explained that based on analysis that had been performed of the failure history of a known bipolar rechargeable battery, two embodiments have been developed and demonstrated for returning lost electrolyte to the solid electrode-separator cell region, thereby creating a more robust-fault tolerant design.

Figure 3:
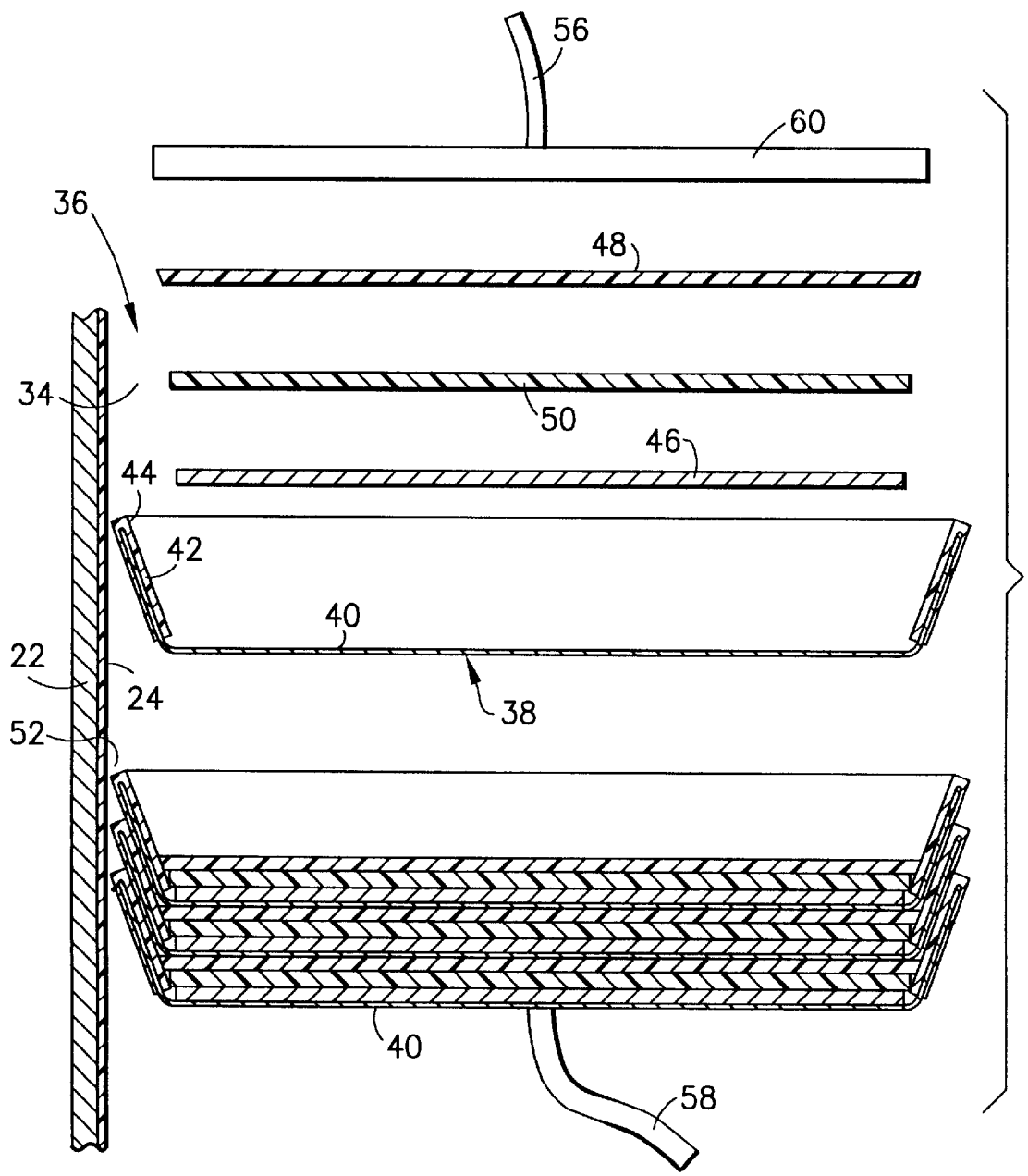
FIG. 3 is a diagrammatic cross section view, partially exploded, similar to FIG. 1 illustrating the construction of a plurality of bipolar cells depicting one embodiment of the present invention.
Figure 3A:
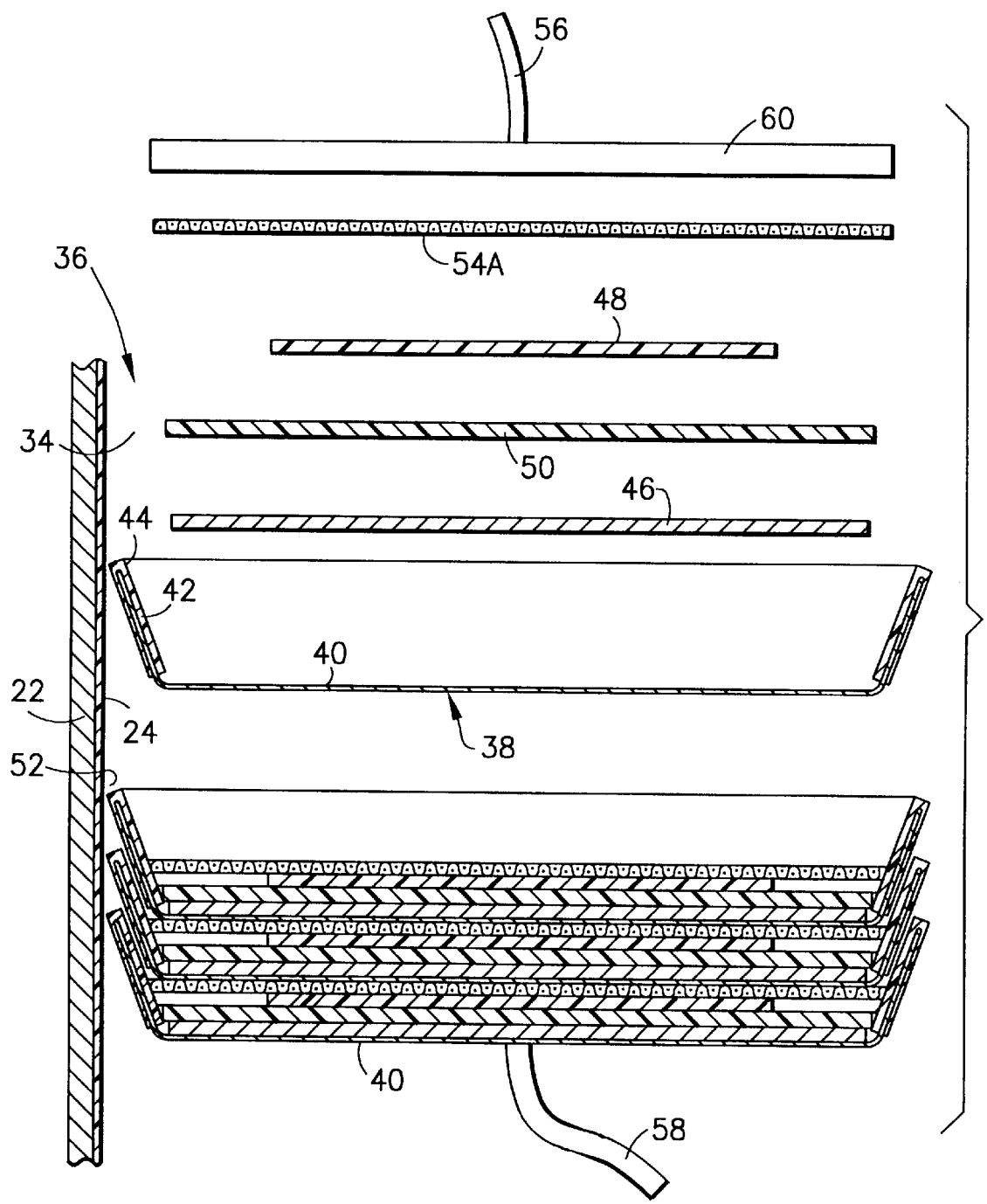
FIG. 3A is a diagrammatic cross section view, similar to FIG. 3, depicting another embodiment of the present invention.

The first embodiment is illustrated in FIG. 3. In this embodiment, the gas screen is eliminated as a cell component and at local areas the size of the gas electrode is reduced thereby exposing the upper bipolar plate to the lower separator in FIG. 3. The basis of this embodiment is that elimination of the gas screen may (a) limit the volume available for escaped electrolyte accumulation, and/or (b) the escaped electrolyte will be forced by the hydrophobic gas electrode film over the upper hydrophilic bipolar surface, and/or (c) will be returned by capillary action to the solid phase electrode-separator region through the exposed access areas.

A concern with this embodiment is whether there will be sufficient gas porosity in the upper hydrophobic region of the negative electrode to support the flow of gas between the external gas storage region of the battery and the gas electrode. This requires a highly porous gas electrode and that the gas phase in the battery be pure active material (e.g., for a nickel hydrogen battery pure hydrogen gas) to prevent the development of a diffusion zone in the gas electrode which would limit the discharge current of the electrode.

In the second embodiment, the coarse gas screen in the conventional design is replaced with a finely pored hydrophilic gas screen 54A such as felted nickel fibers. As in the first embodiment, local areas of the gas electrode are removed to expose the gas screen to the separator.

Successful implementation of this embodiment requires a gas screen whose porosity is fine but larger than the porosity of the separator. If the gas screen pore size is finer than the separator then it could act to pump electrolyte out of the separator and thus lead to an open circuit cell failure. Factually, it has been found that 0.025" thick 90% porous felted nickel fibers work well with 85% porous $ZrO_2$ felt separators in caustic electrolyte nickel hydrogen batteries.

EXAMPLE 1

Figure 1:
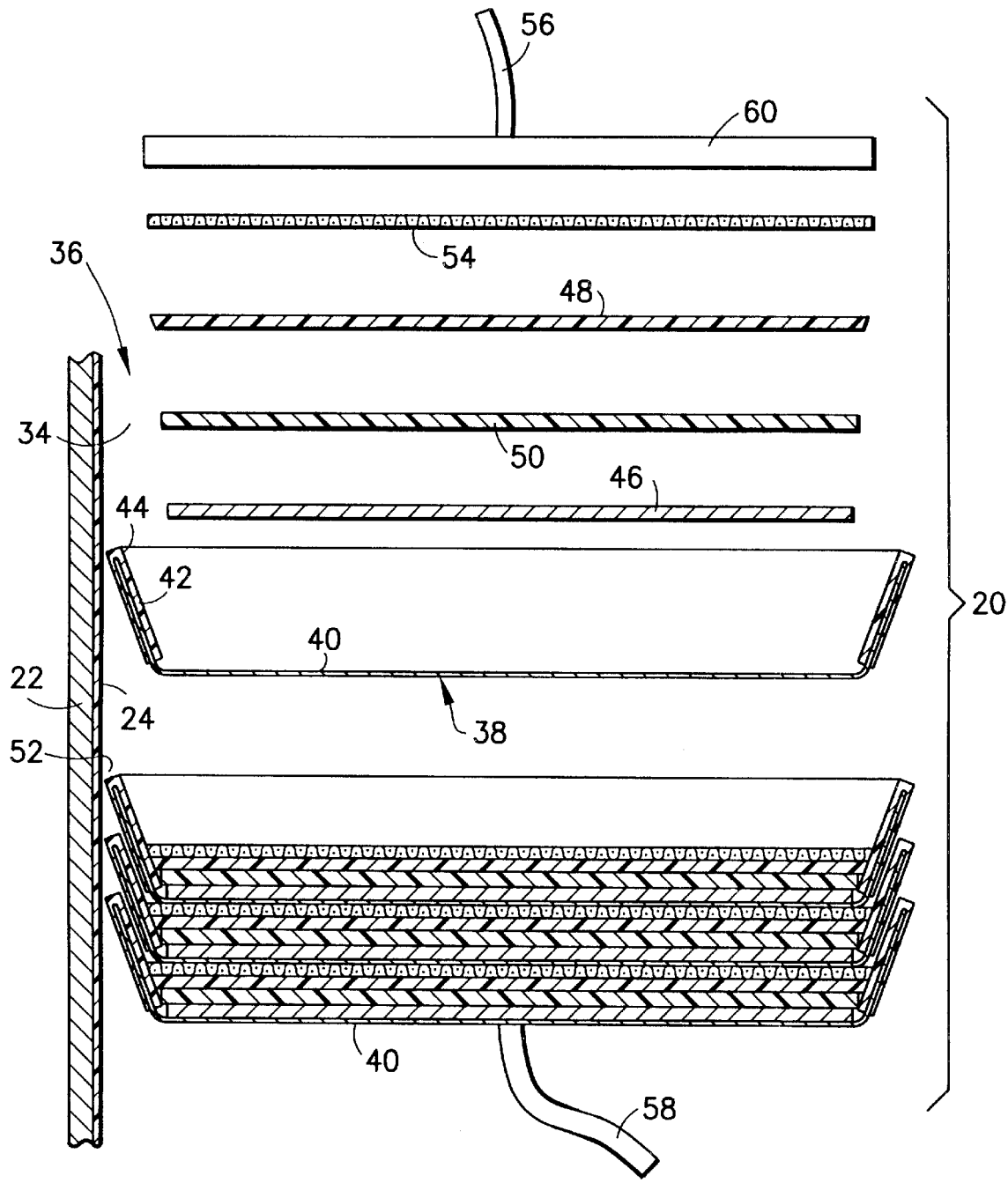
FIG. 1 is a diagrammatic cross section view, partially exploded, illustrating the construction of a plurality of bipolar cells utilized in a battery having a known bipolar gas depolarized cell design.
Figure 2:
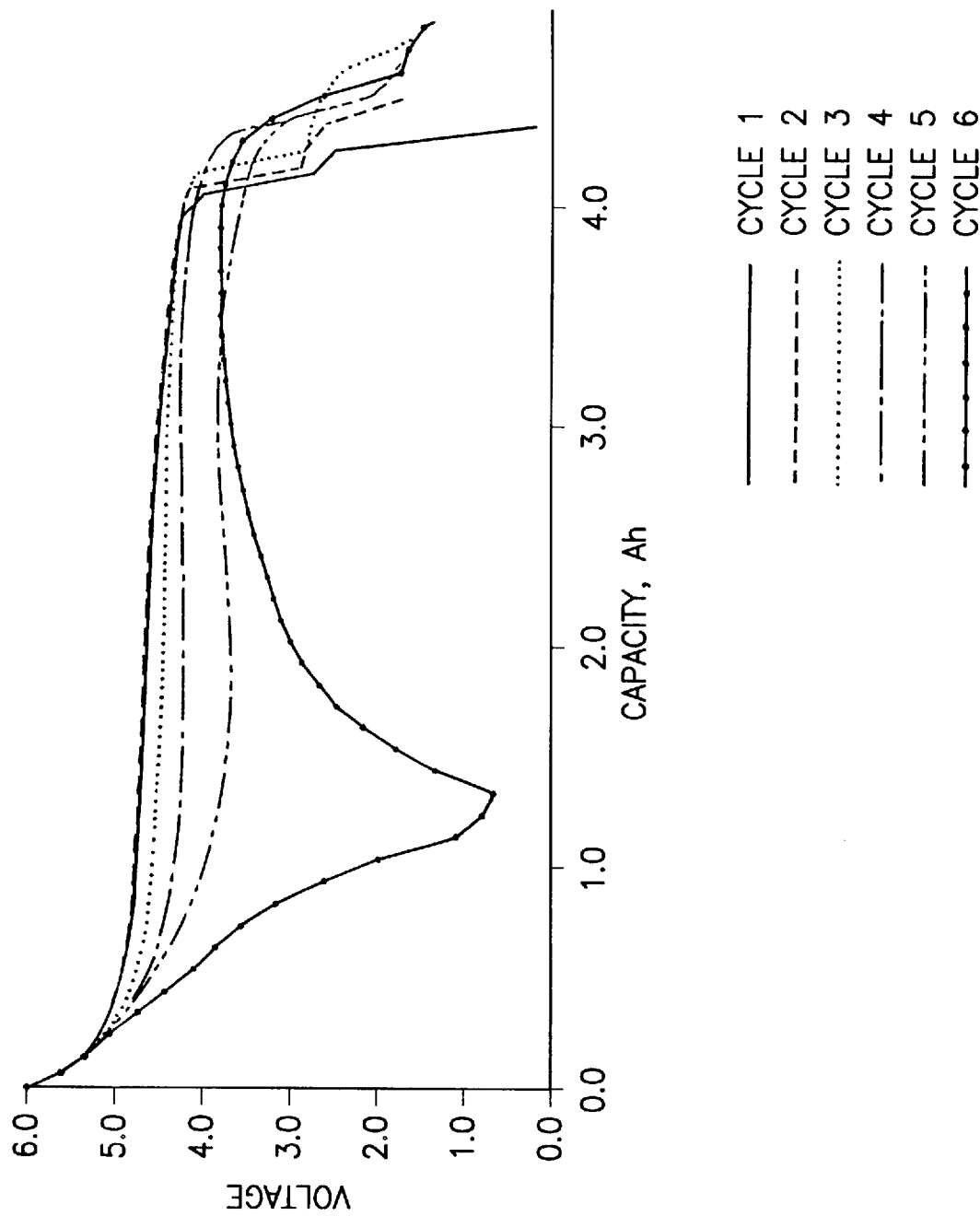
FIG. 2 is a graph depicting the operation of a known battery, as depicted in FIG. 1.
Figure 4:
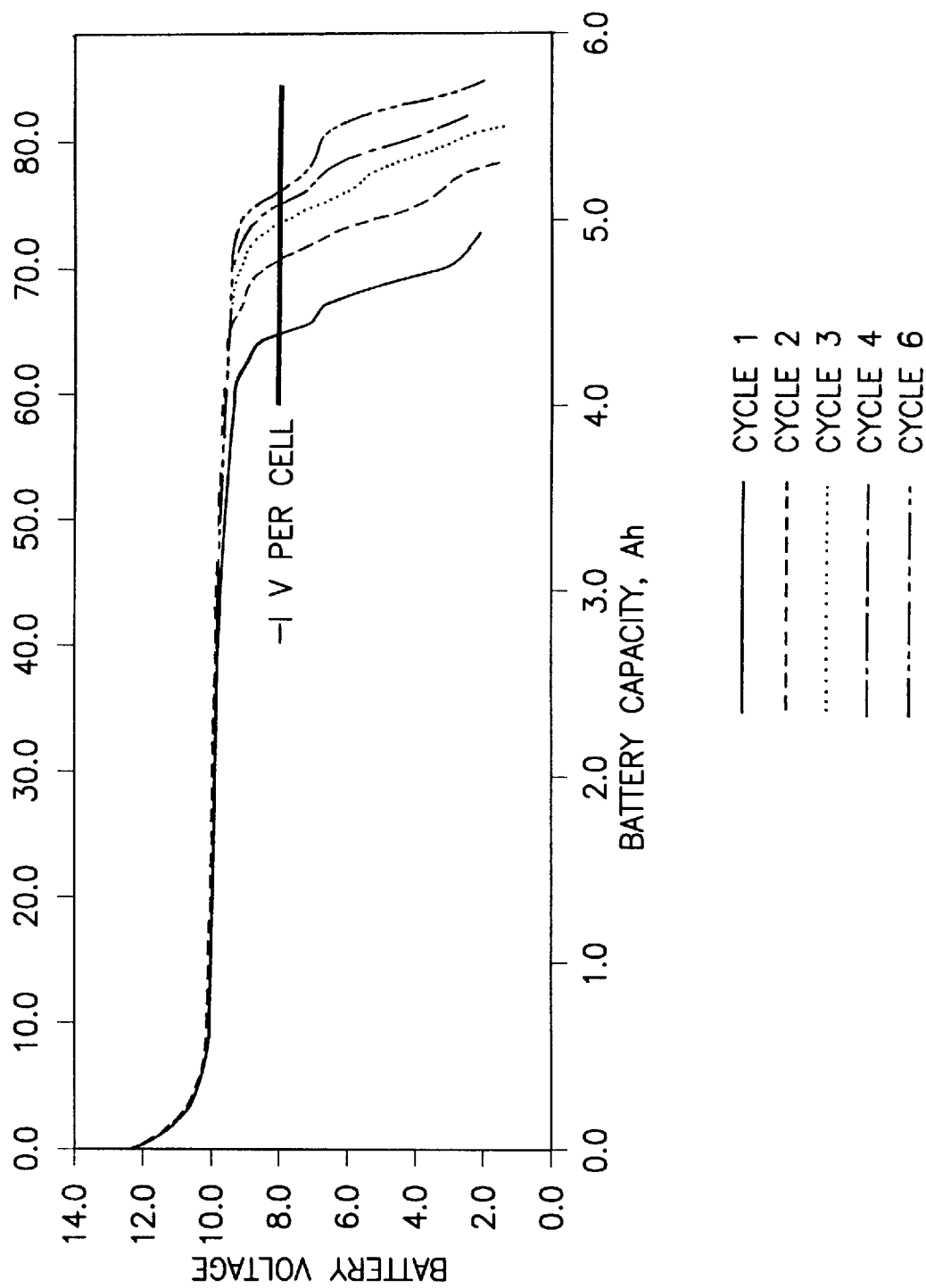
FIG. 4 is a graph depicting the operation of a battery embodying the present invention.

The first embodiment has been reduced to practice in four cell nickel hydrogen battery BPNH53 and in an eight cell nickel hydrogen battery BPNH55. Both batteries utilize a suitable commercial gas electrode which, as with conventional designs, has been found to fail by leakage approximately 25% of the time. This electrode was chosen as it represents a worst case evaluation of the embodiment and it is the lightest (that is, highest performance) design option. Both batteries employed nickel oxide electrodes in sintered nickel substrate (1.8 $g/cm^3$ void volume, 84% porous substrate, 0.035" thick), double $ZrO_2$ felt separators, and 0.001" nickel bipolar structures. The final cell weight was approximately 58 g which is 7 g lighter than the conventional embodiment with heavier gas electrodes and gas screens. As shown in FIG. 4 for battery BPNH55 the embodiment operates flawlessly as opposed to the failed embodiment indicated in FIG. 2.

EXAMPLE 2

The second embodiment has been reduced to practice in a four cell nickel hydrogen battery BPNH52. The positive electrode, separator, electrolyte and bipolar structure designs are identical to those used in the battery of the first embodiment. Battery BPNH52 employed a fine pored felted nickel fibers gas screen and the failure prone SPE electrode. The total cell mass averaged 63 g for the four cells in the battery as compared with a conventional 65 g average mass. The mass average is thus less than with the first embodiment. The battery has undergone 10 cycles of testing to date with no evidence failure due to electrolyte leakage.

While a preferred embodiment of the invention has been disclosed in detail, it should be understood by those skilled in the art that various other modifications may be made to the illustrated embodiment without departing from the scope of the invention as described in the specification and defined in the appended claims.

What is claimed is:

1. A bipolar cell for a gas depolarized rechargeable battery having a plurality of adjoining cells comprising, in a stacked relationship within a battery vessel:

an electrically conductive bipolar base having a peripheral edge;

an hydrophobic insulating member attached to said peripheral edge;

a condensed phase electrode proximate said base;

a porous gas electrode including a condensed current collector for a gaseous active material and being so configured as to permit passage of electrolyte between said bipolar base and a bipolar base of an adjoining cell;

a porous dielectric separator between said condensed phase electrode and said gas electrode; and a gas screen of porous conductive inert material proximate said gas electrode for providing an interface between said cell and an adjoining cell in the battery, said gas screen having a porosity larger than that of said separator;

said insulating member being oriented to enable gas passage from said cell past an adjoining cell to a bulk gas storage region within the battery.

2. A bipolar cell as set forth in claim 1 wherein said gas screen is composed of felted nickel fibers.

3. A bipolar cell as set forth in claim 1 wherein said gas screen has a thickness in the range of 0.0001 to 0.00001 inches and a porosity in the range of 5% to 95%.

4. A bipolar rechargeable battery comprising:

a vessel having an inner surface defining an interior region for bulk gas storage;

a plurality of cells mounted within said vessel in a stacked relationship, each of said cells containing a metered predetermined quantity of electrolyte, each of said cells including:

an electrically conductive bipolar base having a peripheral edge;

an hydrophobic insulating member attached to said peripheral edge;

a condensed phase electrode proximate said base;

a porous gas electrode including a condensed current collector for a gaseous active material and being so configured as to permit passage of electrolyte between said bipolar base and a bipolar base of an adjoining cell;

a dielectric separator between said condensed phase electrode and said gas electrode;

a gas screen of porous conductive inert material proximate said gas electrode for providing an interface between said cell and an adjoining cell in the battery, said gas screen having a porosity larger than that of said separator;

said insulating member of said plurality of cells being oriented to enable gas passage from each of said cells to the bulk gas region within the battery.

5. A bipolar rechargeable battery as set forth in claim 4 including:

an insulating liner on said inner surface of said vessel to prevent electrolyte solution bridging between said cells via the wall of said vessel.

6. A bipolar cell as set forth in claim 4 wherein said gas screen is composed of felted nickel fibers.

7. A bipolar cell as set forth in claim 6 wherein said gas screen has a thickness in the range of 0.0001 to 0.00001 inches and a porosity in the range of 5% to 95%.

8. A bipolar cell for a gas depolarized rechargeable battery having a plurality of adjoining cells comprising, in a stacked relationship within a battery vessel:

a metallic bipolar cup having a base and an integral upstanding side wall encompassing said base;

an hydrophobic insulating material covering said upstanding side wall;

a condensed phase electrode overlying said base;

a porous gas electrode including a condensed current collector for a gaseous active material and being so configured as to permit passage of electrolyte between said bipolar base and a bipolar base of an adjoining cell;

a dielectric separator between said condensed phase electrode and said gas electrode; and a gas screen of porous conductive inert material proximate said gas electrode for providing an interface between said cell and an adjoining cell in the battery, said gas screen having a porosity larger than that of said separator;

said upstanding side wall being oriented to enable gas passage from said cell past an adjoining cell to a bulk gas storage region within the battery.

9. A bipolar cell as set forth in claim 8 wherein said upstanding side wall is of truncated conical shape diverging with increased distance from said base;

whereby said upstanding side wall of said cell and an adjacent upstanding side wall of an adjacent cell together define a gap enabling gas communication between said cell and the adjacent cell and between each of said cell and the adjacent cell and a bulk gas storage region within the battery.

10. A bipolar rechargeable battery as set forth in claim 8 including:

an insulating liner on said inner surface of said vessel to prevent electrolyte solution bridging between said cells via the wall of said vessel.

11. A bipolar cell as set forth in claim 8 wherein said gas screen is composed of felted nickel fibers.

12. A bipolar cell as set forth in claim 8 wherein said gas screen has a thickness in the range of 0.0001 to 0.00001 inches and a porosity in the range of 5% to 95%.

13. A bipolar rechargeable battery comprising:

a vessel having an inner surface defining an interior region for bulk gas storage;

a plurality of cells mounted within said vessel in a nested relationship, each cell containing a metered predetermined quantity of electrolyte, each of said cells including:

a metallic bipolar cup having a base and an integral upstanding side wall encompassing said base;

an insulating material covering said upstanding side wall;

a condensed phase electrode proximate said base;

a porous gas electrode including a condensed current collector for a gaseous active material and being so configured as to permit passage of electrolyte between said bipolar base and a bipolar base of an adjoining cell;

a dielectric separator between said condensed phase electrode and said gas electrode; and a gas screen of porous conductive inert material proximate said gas electrode for providing an interface between said cell and an adjoining cell in the battery, said gas screen having a porosity larger than that of said separator;

said upstanding side wall of said plurality of cells being oriented to enable gas passage from each of said cells to the bulk gas region within the battery.

14. A bipolar rechargeable battery as set forth in claim 13 including:

an insulating liner on said inner surface of said vessel for assuring the fluid integrity thereof.

15. A bipolar rechargeable battery as set forth in claim 13 wherein each of said upstanding side walls is of truncated conical shape diverging with increased distance from said base;

whereby said upstanding side walls of adjacent ones of said cells mutually define a gap enabling gas communication between said adjacent cells and between each of said cells and the interior region of said vessel.

16. A bipolar rechargeable battery as set forth in claim 13 wherein said battery is a nickel hydrogen battery; and wherein said vessel is a pressure vessel.

17. A bipolar rechargeable battery as set forth in claim 13 including:

an insulating liner on said inner surface of said vessel to prevent electrolyte solution bridging between said cells via the wall of said vessel.

18. A bipolar cell as set forth in claim 13 wherein said gas screen is composed of felted nickel fibers.

19. A bipolar cell as set forth in claim 13 wherein said gas screen has a thickness in the range of 0.0001 to 0.00001 inches and a porosity in the range of 5% to 95%.

20. A bipolar cell for a gas depolarized rechargeable battery having a plurality of adjoining cells in a stacked relationship within a battery vessel consisting of:

an electrically conductive bipolar base having a peripheral edge;

an hydrophobic insulating member attached to said peripheral edge;

a condensed phase electrode proximate said base;

a porous gas electrode including a condensed current collector for a gaseous active material and being so configured as to permit passage of electrolyte between said bipolar base and a bipolar base of an adjoining cell; and a porous dielectric separator between said condensed phase electrode and said gas electrode;

said insulating member being oriented to enable gas passage from said cell past an adjoining cell to a bulk gas storage region within the battery.

21. A bipolar rechargeable battery comprising:

a vessel having an inner surface defining an interior region for bulk gas storage;

a plurality of cells mounted within said vessel in a stacked relationship, each of said cells containing a metered predetermined quantity of electrolyte, each of said cells consisting of:

an electrically conductive bipolar base having a peripheral edge;

an hydrophobic insulating member attached to said peripheral edge;

a condensed phase electrode proximate said base;

a porous gas electrode including a condensed current collector for a gaseous active material and being so configured as to permit passage of electrolyte between said bipolar base and a bipolar base of an adjoining cell; and a dielectric separator between said condensed phase electrode and said gas electrode;

said insulating member of said plurality of cells being oriented to enable gas passage from each of said cells to the bulk gas region within the battery.

22. A bipolar cell for a gas depolarized rechargeable battery having a plurality of adjoining cells in a stacked relationship within a battery vessel consisting of:

a metallic bipolar cup having a base and an integral upstanding side wall encompassing said base;

an hydrophobic insulating material covering said upstanding side wall;

a condensed phase electrode overlying said base;

a porous gas electrode including a condensed current collector for a gaseous active material and being so configured as to permit passage of electrolyte between said bipolar base and a bipolar base of an adjoining cell; and a dielectric separator between said condensed phase electrode and said gas electrode;

said upstanding side wall being oriented to enable gas passage from said cell past an adjoining cell to a bulk gas storage region within the battery.

23. A bipolar rechargeable battery comprising:

a vessel having an inner surface defining an interior region for bulk gas storage;

a plurality of cells mounted within said vessel in a nested relationship, each cell containing a metered predetermined quantity of electrolyte, each of said cells consisting of:

a metallic bipolar cup having a base and an integral upstanding side wall encompassing said base;

an insulating material covering said upstanding side wall;

a condensed phase electrode proximate said base;

a porous gas electrode including a condensed current collector for a gaseous active material and being so configured as to permit passage of electrolyte between said bipolar base and a bipolar base of an adjoining cell; and a dielectric separator between said condensed phase electrode and said gas electrode;

said upstanding side wall of said plurality of cells being oriented to enable gas passage from each of said cells to the bulk gas region within the battery.

* * * * *